United States Patent
Wu et al.

(10) Patent No.: US 6,353,685 B1
(45) Date of Patent: Mar. 5, 2002

(54) METHOD AND APPARATUS FOR IMAGE COMPRESSION

(75) Inventors: Tony Hung-Yao Wu, Milpitas; Wei-Chun Lee, Mountain View; Chia-Hung Chen, Sunnyvale; Der-Ren Chu, San Jose; Sophia Wei-Chun Kao, Cupertino; Kang-Huai Wang, Saratoga; Ren-Yuh Wang, Cupertino, all of CA (US)

(73) Assignee: Divio, Inc., Sunnyvale, CA (US)

(*) Notice: Subject to any disclaimer, the term of this patent is extended or adjusted under 35 U.S.C. 154(b) by 0 days.

(21) Appl. No.: 09/386,251

(22) Filed: Aug. 31, 1999

Related U.S. Application Data

(60) Provisional application No. 60/098,844, filed on Sep. 2, 1998, provisional application No. 60/098,772, filed on Sep. 1, 1998, provisional application No. 60/098,728, filed on Sep. 1, 1998, and provisional application No. 60/098,752, filed on Sep. 1, 1998.

(51) Int. Cl.$^7$ .................................. G06K 9/46
(52) U.S. Cl. .................. 382/250; 382/251; 375/240.03; 375/240.2
(58) Field of Search ................ 382/250–251, 382/236, 248, 232, 309; 348/395, 403, 408; 358/432–433, 426, 261.3; 708/400–405, 203; 375/240, 240.01, 240.2, 240.25, 240.26, 240.27, 240.29, 240.03; 386/46, 68, 67, 81, 109, 124; 710/68; 345/501

(56) References Cited

U.S. PATENT DOCUMENTS

| | | | |
|---|---|---|---|
| 5,379,351 A | 1/1995 | Fandrianto et al. | 382/236 |
| 5,577,190 A | 11/1996 | Peters | 345/501 |
| 5,809,200 A | 9/1998 | Nishimoto et al. | 386/46 |
| 5,870,144 A * | 2/1999 | Guerrera | 348/403 |
| 5,964,824 A * | 10/1999 | Murata et al. | 708/402 |
| 6,023,531 A | 2/2000 | Peters | 382/232 |
| 6,134,270 A * | 10/2000 | Mou | 375/240 |

OTHER PUBLICATIONS

Wallace G.K, JPEG still picture compression standard, consumer electronics, IEEE vol. 38 xviii–xxxiv, Feb. 1992.*

* cited by examiner

*Primary Examiner*—Leo Boudreau
*Assistant Examiner*—Ishrat Sherali
(74) *Attorney, Agent, or Firm*—Flehr Hohbach Test Albritton & Herbert LLP

(57) ABSTRACT

An image compression apparatus for compressing image data provided to an input terminal and providing compressed data to an output terminal includes a 4×4 weighted digital cosine transformer (DCT) coupled to the input terminal and configured to convert the image data into weighted frequency data. A zigzag circuit is coupled to the DCT and configured to zigzag process the frequency data and generate create zigzag data. A Q-factor estimator is coupled to the DCT and configured to estimate the frequency data and generate a Q-factor. A DC coding circuit is coupled to the zigzag circuit and configured to code the zigzag data and generate a DC code. A quantization circuit is coupled to the zigzag circuit and the Q-factor estimator and configured to quantize the zigzag data based on the Q-factor and generate quantized data. A run-length coding circuit coupled to the DC coding circuit and the quantization circuit and configured to encode the quantized data to create variable length data as the compressed data to the output terminal. In this manner, the original image is compressed. While the invention is described with reference to specific hardware, the invention can also be implemented in software employing the functions as described herein. Advantages of the present invention include an image compression technique that is both fast and efficient. Additionally, the invention provides a fast and efficient image compression technique that can be applied to moving images.

22 Claims, 14 Drawing Sheets

$Y_{0,0}$ $Y_{0,1}$ $Y_{0,2}$ $Y_{0,3}$ $Y_{0,4}$ $Y_{0,5}$ $Y_{0,6}$ $Y_{0,7}$ ........ $Y_{0,636}$ $Y_{0,637}$ $Y_{0,638}$ $Y_{0,639}$ $Y_{1,0}$ $Y_{1,1}$ $Y_{1,2}$ $Y_{1,3}$ $Y_{1,4}$ $Y_{1,5}$ $Y_{1,6}$ $Y_{1,7}$ ........ $Y_{1,636}$ $Y_{1,637}$ $Y_{1,638}$ $Y_{1,639}$ $Y_{2,0}$ $Y_{2,1}$ $Y_{2,2}$ $Y_{2,3}$ $Y_{2,4}$ $Y_{2,5}$ $Y_{2,6}$ $Y_{2,7}$ ........ $Y_{2,636}$ $Y_{2,637}$ $Y_{2,638}$ $Y_{2,639}$ $Y_{3,0}$ $Y_{3,1}$ $Y_{3,2}$ $Y_{3,3}$ $Y_{3,4}$ $Y_{3,5}$ $Y_{3,6}$ $Y_{3,7}$ ........ $Y_{3,636}$ $Y_{3,637}$ $Y_{3,638}$ $Y_{3,639}$ (end of 4 lines)

$Y_{0,636}$ $Y_{0,637}$ $Y_{0,638}$ $Y_{0,639}$ $Y_{1,636}$ $Y_{1,637}$ $Y_{1,638}$ $Y_{1,639}$ $Y_{2,636}$ $Y_{2,637}$ $Y_{2,638}$ $Y_{2,639}$ $Y_{3,636}$ $Y_{3,637}$ $Y_{3,638}$ $Y_{3,639}$ (end of 4 lines)

$Y_{4,0}$ $Y_{4,1}$ $Y_{4,2}$ $Y_{4,3}$ $Y_{5,0}$ $Y_{5,1}$ $Y_{5,2}$ $Y_{5,3}$ $Y_{6,0}$ $Y_{6,1}$ $Y_{6,2}$ $Y_{6,3}$ $Y_{7,0}$ $Y_{7,1}$ $Y_{7,2}$ $Y_{7,3}$

...............................................................................

FIG. 2B 0000 0001 0002 0003 .......... 0636 0637 0638 0639 (for $Y_{0,0}$ to $Y_{0,639}$)
0640 0641 0642 0643 .......... 1276 1277 1278 1279 (for $Y_{1,0}$ to $Y_{1,639}$)
1280 1281 1282 1283 .......... 1916 1917 1918 1919 (for $Y_{2,0}$ to $Y_{2,639}$)
1920 1921 1922 1923 .......... 2566 2567 2568 2569 (for $Y_{3,0}$ to $Y_{3,639}$)

FIG. 2C 0000 0001 0002 0003 0640 0641 0642 0643
1280 1281 1282 1283 1920 1921 1922 1923
0004 0005 0006 0007 0644 0645 0646 0647
1284 1285 1286 1287 1924 1925 1926 1927
..........
0636 0637 0638 0639 1276 1277 1278 1279
1916 1917 1918 1919 2566 2567 2568 2569    (end of 4 lines)

FIG. 2D

0000 0001 0002 0003 .......... 0156 0157 0158 0159 (for $Y_{0,0-3}$ to $Y_{0,636-639}$)
0160 0161 0162 0163 .......... 0316 0317 0318 0319 (for $Y_{1,0-3}$ to $Y_{1,636-639}$)
0320 0321 0322 0323 .......... 0476 0477 0478 0479 (for $Y_{2,0-3}$ to $Y_{2,636-639}$)
0480 0481 0482 0483 .......... 0636 0637 0638 0639 (for $Y_{3,0-3}$ to $Y_{3,636-639}$)

FIG. 2E

0000 0160 0320 0480 0001 0161 0321 0481
0002 0162 0322 0482 0003 0163 0323 0483
..........
0156 0316 0476 0636 0157 0317 0477 0637
0158 0318 0478 0638 0159 0319 0479 0639    (end of 4 lines)

FIG. 2F

4 x 4 DCT and weighting

2D DCT:

$$S(v, u) = \frac{c(u)}{\sqrt{2}} \frac{c(v)}{\sqrt{2}} \sum_{y=0}^{3} \sum_{y=0}^{3} s(x, y) \cos\left[\frac{(2x+1)u\pi}{8}\right] \cos\left[\frac{(2y+1)v\pi}{8}\right]$$

where $C(u) = \begin{cases} \frac{1}{\sqrt{2}} & \text{if } u = 0 \\ 1 & \text{if } u \neq 0 \end{cases}$

FIG. 3A

1D DCT:

Because 2D DCT is separable, we can use 1D DCT to implement 2D DCT. Following is the matrix form of 1D DCT:

$$\begin{bmatrix} Y_0 \\ Y_1 \\ Y_2 \\ Y_3 \end{bmatrix} = A \cdot \begin{bmatrix} X_0 \\ X_1 \\ X_2 \\ X_3 \end{bmatrix} \quad \text{where} \quad A = \begin{bmatrix} a & a & a & a \\ b & c & -c & -b \\ a & -a & -a & a \\ c & -b & b & -c \end{bmatrix}$$

$a = \sqrt{\frac{2}{4}} \cos\frac{\pi}{4} = .5$ $b = \sqrt{\frac{2}{4}} \cos\frac{\pi}{5} = .6533$ $c = \sqrt{\frac{2}{4}} \cos\frac{3\pi}{8} = .2706$

FIG. 3B          FIG. 3C

1D DCT can be written in another form:

$$\begin{bmatrix} Y_0 \\ Y_2 \end{bmatrix} = \begin{bmatrix} a & a \\ a & -a \end{bmatrix} \begin{bmatrix} X_0 + X_3 \\ X_1 + X_2 \end{bmatrix}$$

$$\begin{bmatrix} Y_1 \\ Y_3 \end{bmatrix} = \begin{bmatrix} b & c \\ c & -b \end{bmatrix} \begin{bmatrix} X_0 - X_3 \\ X_1 - X_2 \end{bmatrix}$$

FIG. 3D

Weighting for 2D DCT:

$$w(i, j) = \begin{cases} \frac{1}{4} & \text{if } i=0 \text{ \& } j=0 \\ w(i) \cdot w(j) \cdot \frac{1}{2} & \text{otherwise} \end{cases}$$

where  $w(0) = 1$    $w(2) = 0.895$
       $w(1) = 0.9239$    $w(3) = 0.7654$

FIG. 3E

Weighted 1D DCT:

After merging the 1D DCT and weighting the final 1D DCT equations are:

$$\begin{bmatrix} 2Y_{w0} \\ 2Y_{w2} \end{bmatrix} = \begin{bmatrix} \frac{1}{2} & \frac{1}{2} \\ \frac{7}{16} & \frac{-7}{16} \end{bmatrix} \begin{bmatrix} X_0 + X_3 \\ X_1 + X_2 \end{bmatrix}$$

$$\begin{bmatrix} 2Y_{w1} \\ 2Y_{w3} \end{bmatrix} = \begin{bmatrix} 0.6036 & \frac{1}{4} \\ 0.2071 & \frac{-1}{2} \end{bmatrix} \begin{bmatrix} X_0 - X_3 \\ X_1 - X_2 \end{bmatrix}$$

FIG. 3F

Implementation of multiplication:

(1) $\frac{1}{2}, \frac{1}{4}$ can be easily implemented by shift (2) $i \cdot \frac{7}{16} = (i>>1) - (i>>4)$ (3) $i \cdot 0.6036 \approx (i>>1) + (i>>3) - (i>>6) - (i>>7) + (i>>9)$ (4) $i \cdot 0.2071 \approx (i>>3) + (i>>4) + (i>>6) + (i>>8)$ Architecture of 1D DCT:

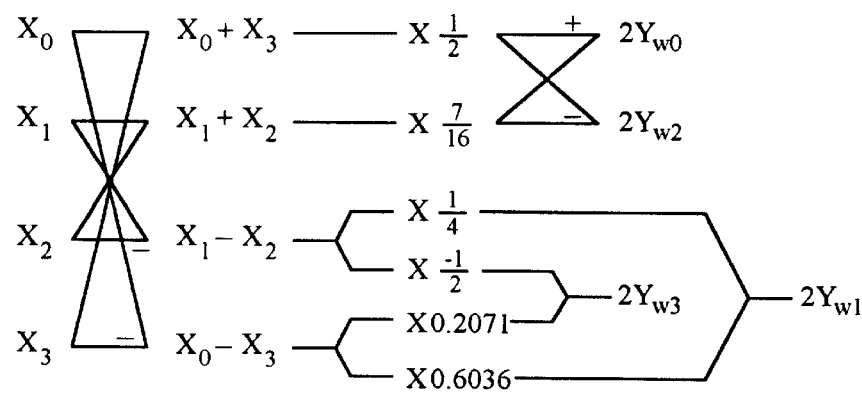

FIG. 3G

Architecture of 2D DCT:

2D DCT can be implemented by 1D DCT and transpose RAM. The operation of transpose RAM:

I/P (order):   0 1 2 3     4 5 6 7     8 9 A B     C D E F
O/P (order):   0 4 8 C     1 5 9 D     2 6 A E     3 7 B F

| DC | 0 | 0 | 1 |
|---|---|---|---|
| 0 | 0 | 1 | 1 |
| 0 | 1 | 1 | 1 |
| 1 | 1 | 1 | 1 |

| Run | Amp | Code | Length | Probability |
|---|---|---|---|---|
| EOB | | 00 | 2 | 20.5006% |
| 0 | 1 | 10s | 3 | 35.9443% |
| 0 | 2 | 011s | 4 | 11.7170% |
| 1 | 1 | 110s | 4 | 9.7841% |
| 0 | 3 | 1110s | 5 | 4.2357% |
| 2 | 1 | 01000s | 6 | 4.0814% |
| 3 | 1 | 01011s | 6 | 2.3621% |
| 1 | 2 | 010010s | 7 | 1.8945% |
| 0 | 4 | 010100s | 7 | 1.7546% |
| 4 | 1 | 111101s | 7 | 1.0641% |
| 0 | 5 | 111110s | 7 | 0.9913% |
| 5 | 1 | 1111000s | 8 | 0.5920% |
| 1 | 3 | 1111001s | 8 | 0.5280% |
| 0 | 6 | 1111110s | 8 | 0.5097% |
| 2 | 2 | 01010100s | 9 | 0.3823% |
| 6 | 1 | 01010111s | 9 | 0.2707% |
| 0 | 7 | 11111111s | 9 | 0.2090% |
| 3 | 2 | 010101010s | 10 | 0.1999% |
| 1 | 4 | 010101100s | 10 | 0.1735% |
| 0 | 8 | 111111100s | 10 | 0.1349% |
| 1 | 5 | 0101010110s | 11 | 0.0933% |
| 0 | 9 | 0101010111s | 11 | 0.0889% |
| 7 | 1 | 0101011010s | 11 | 0.0819% |
| 2 | 3 | 0101011011s | 11 | 0.0685% |
| 0 | 10 | 1111111010s | 11 | 0.0600% |
| 8 | 1 | 1111111011s | 11 | 0.0586% |
| 0=<run<5 | Amp | 0100110srrraaaaa | 16 | |
| Run>=5 | Amp | 0100111srrrraaaa | 16 | |

FIG. 6

| Amp | Run | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 3 | 4 | 6 | 6 | 7 | 8 | 9 | 11 | 11 | | | | | | |
| 2 | 4 | 7 | 9 | 10 | | | | | | | | | | | |
| 3 | 5 | 8 | 11 | | | | | | | | | | | | |
| 4 | 7 | 10 | | | | | | | | | | | | | |
| 5 | 7 | 11 | | | | | | | | | | | | | |
| 6 | 8 | | | | | | | | | | | | | | |
| 7 | 9 | | | | | | | | | | | | | | |
| 8 | 10 | | | | | | | | | | | | | | |
| 9 | 11 | | | | | | | | | | | | | | |
| 10 | 11 | | | | | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16-31 | | | | | | | | | | | | | | | |

FIG. 7

| Name | Size | FR | Data Rate (Mbytes/sec) | CR |
|------|------|----|------------------------|-----|
| VGA | 640x480 | 5-10 | 640x480x1.5x10=4.6M | 6-8 |
| CIF | 352x288 | 25 | 352x288x1.5x25=3.8M | 4-6 |
| QCIF | 176x144 | 25 | 176x144x1.5x25=0.95M | 3 |
| SIF | 320x240 | 30 | 320x240x1.5x30=3.5M | 4-6 |
| QSIF | 160x120 | 30 | 160x120x1.5x30=.9M | 3 |

METHOD AND APPARATUS FOR IMAGE COMPRESSION

REFERENCE TO RELATED APPLICATIONS

This application claims priority to Provisional Application Nos. 60/098,844 filed Sep. 2, 1998; 60/098,772 filed Sep. 1, 1998; 60/098,728 filed Sep. 1, 1998; and 60/098,752 filed Sep. 1, 1998, incorporated herein by reference.

FIELD

The present invention relates to a method and apparatus for image compression. In particular, the invention provides an image compression technique that is faster and more efficient than conventional image compression techniques.

BACKGROUND

Visual communications is no longer thought about in terms of when, if, or will be. The need, and the underlying technologies are there—now. What's been missing is the availability of digital video at the best quality and performance possible, at a cost that isn't prohibitive. The digital video camera is becoming the next great input device for the PC. And the only way to get high quality video images into PC is through a camera. However, due to the large bandwidth requirement to transmit huge amount of video data, engineers are scrambling to determine feasible solutions.

A conventional solution is using an external capture card coupled to a camera. The camera transmits every frame of video data back to the capture card via regular cable. To install the system, the users have to remove a computer housing, plug in the cards, and potentially solve the hardware/software conflicts to have a working system. Though this solution can support full frame-rate, full-color depth, it is somewhat an expensive solution.

Another solution is Image compression, which is a beneficial technique for reducing the size of data that defines an image. Conventional image compression techniques are well known in the art and include JPEG (directed at still images) and MPEG (directed at moving images). While the JPEG standard is directed at still images, it can be applied to moving images so long as the images are communicated on a frame-by-frame basis. The MPEG standard utilizes sophisticated movement analysis that provides high compression, but also requires significant processing capabilities.

Conventional JPEG image compression takes regions of an image (typically an 8×8 group of pixels) and characterizes each region as a block. The technique then converts the block from the time domain to the frequency domain using a discrete cosine transform (DCT). The data is then quantized and entropy encoded. JPEG can reduce image data significantly (by 50–90%) depending on the image. However, JPEG requires a fair amount of processing capability in order to process the data. Accordingly, one of the limitations of conventional JPEG is that it has a block size fixed at 8×8 and requires a fair amount of processing to compress and decompress the image.

A goal of the invention is to overcome the identified limitations and provide an image compression technique that is both fast and efficient. Additionally, a goal of the invention is to provide a fast and efficient image compression technique that can be applied to moving images.

SUMMARY

The invention overcomes the identified problems and provides an image compression technique that is both fast and efficient. Additionally, the invention provides a fast and efficient image compression technique that can be applied to moving images. The invention is sometimes referred to herein as JPEG-Lite. An exemplary embodiment of an image compression apparatus for compressing image data provided to an input terminal and providing compressed data to an output terminal includes a 4×4 weighted digital cosine transformer (DCT) coupled to the input terminal and configured to convert the image data into weighted frequency data. A zigzag circuit is coupled to the DCT and configured to zigzag process the frequency data and generate create zigzag data. A Q-factor estimator is coupled to the DCT and configured to estimate the frequency data and generate a Q-factor. A DC coding circuit is coupled to the zigzag circuit and configured to code the zigzag data and generate a DC code. A quantization circuit is coupled to the zigzag circuit and the Q-factor estimator and configured to quantize the zigzag data based on the Q-factor and generate quantized data. A run-length coding circuit is coupled to the DC coding circuit and the quantization circuit and configured to encode the quantized data to create variable length data as the compressed data to the output terminal. In this manner, the original image is compressed.

In one aspect of the invention, the invention divides the 4×4 weighted DCT into a two-dimensional DCT for processing. In another aspect of the invention, the two-dimensional DCT is further divided into a one-dimensional DCT for processing. In these aspects of the invention a special coefficient table is employed to gain a high degree of compression. A quantization table is selected to provide high compression while retaining a significant amount of reproducibility of the original image. A DC coder is also selected to improve compression. Run Length Coding (RLC) and variable length coding (VLC) can also be employed to improve compression.

One embodiment of the invention provides that when bandwidth is limited between the image capturing device (e.g. camera) and the storing device (e.g. computer) or reproducing device (e.g. monitor), a dynamic bit rate controller is invoked to reduce the bandwidth while maintaining a high quality image. Another embodiment of the invention provides error detection so that the receiving device can identify errors and take steps to prevent the errors from corrupting the entire image. Additionally, while the invention is described with reference to specific hardware, the invention can also be implemented in software employing the functions as described herein.

Advantages of the present invention include an image compression technique that is both fast and efficient. Additionally, the invention provides a fast and efficient image compression technique that can be applied to moving images.

BRIEF DESCRIPTION OF THE FIGURES

Additional advantages of the invention will become apparent upon reading the following detailed description and upon reference to the drawings, in which:

FIGS. 2A–F depict pixel data according to an embodiment of the invention;

FIGS. 3A–H depict the 4×4 digital cosine transform used in the invention;

FIG. 6 depicts the Run-length code-table used in the invention;

FIG. 7 is an encoding space for the invention;

DETAILED DESCRIPTION

Exemplary embodiments are described with reference to specific configurations. Those skilled in the art will appreciate that various changes and modifications can be made while remaining within the scope of the claims. For example, while the invention is described with reference to specific hardware implementations, the invention can be accomplished in software.

A. Video Compression Architecture

Figure 1A:
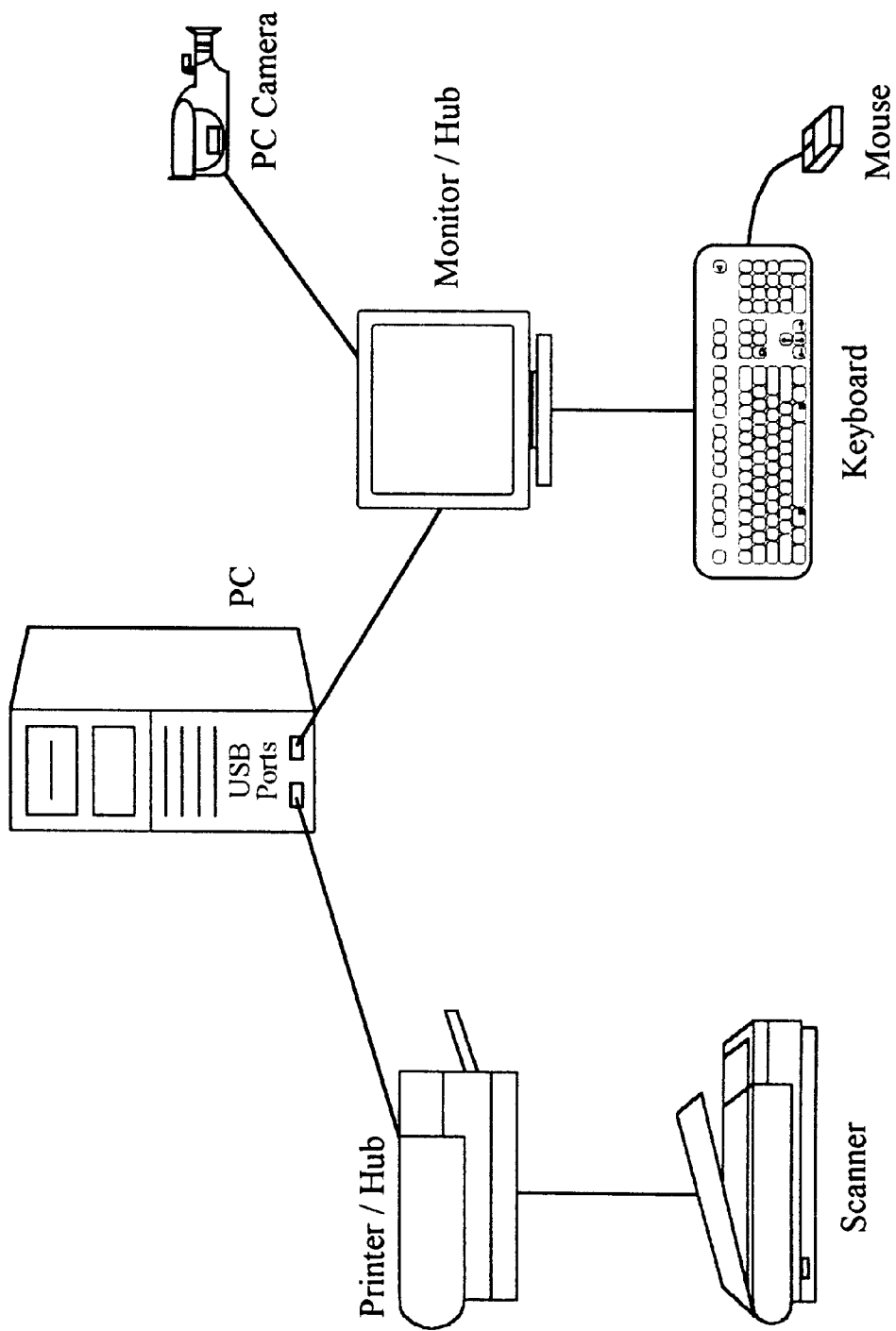
FIG. 1 depicts a video compression architecture according to an embodiment of the invention.
Figure 1B:
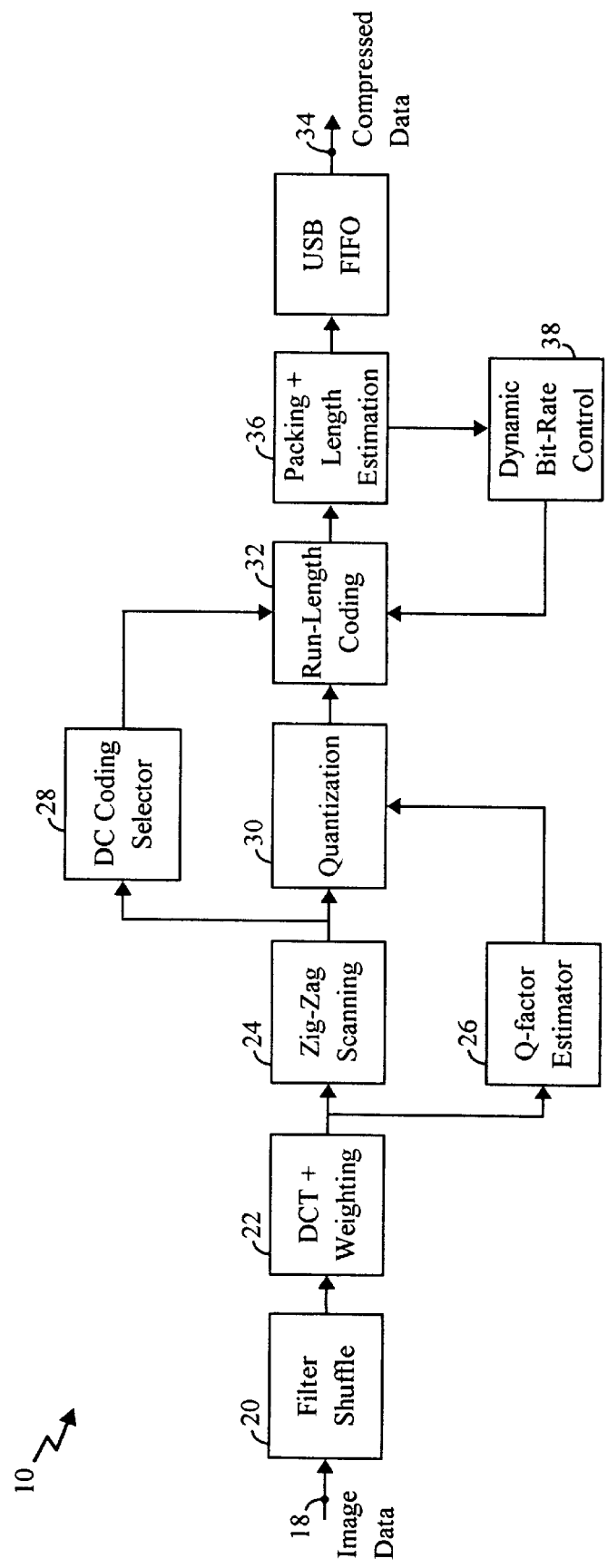

FIG. 1 depicts a video compression architecture 10 according to an embodiment of the invention. A image is provided to an input terminal 18 based on a pixel representation, which is called image data. A filter and shuffle circuit 20 is coupled to the input terminal and is configured to shuffle the image data. A 4×4 digital cosine transform (DCT) circuit 22 is coupled to the filter and shuffle circuit and is configured to convert the image data into weighted frequency data. The weighting of the DCT is described below. A zigzag circuit 24 is coupled to the DCT and is configured to zigzag process the frequency data and generate create zigzag data. A Q-factor estimator 26 is coupled to the DCT and positioned in parallel with the zigzag circuit. The Q-factor estimator is configured to estimate the frequency data and generate a Q-factor. A DC coding circuit 28 is coupled to the zigzag circuit and is configured to code the zigzag data and generate a DC code. A quantization circuit 30 is coupled to the zigzag circuit and the Q-factor estimator and configured to quantize the zigzag data based on the Q-factor provided by the Q-factor estimator and to generate quantized data. A run-length coding circuit (RLC) 32 is coupled to the DC coding circuit and the quantization circuit and is configured to encode the quantized data to create variable length data as the compressed data to the output terminal 34. In one embodiment, a packing and length estimation circuit 36 is coupled to the run-length encoding circuit before the output terminal. A bit-rate controller (BRC) 38 is coupled to the packing and length estimation circuit and to the run-length encoder circuit. The BRC is configured to monitor the output data from the VLC and to reduce the data when necessary, as explained below.

In another embodiment, a receiving device coupled to the output terminal 34 contains an error detection and recovery circuit 36 configured to identify errors in the compressed data and to prevent an error from ruining the data. The error detection and recovery circuit allows the receiving device to reconstruct the image as well as possible and to prevent the error from harming reconstruction of subsequent images.

B. Filtering & Shuffling

A purpose of this design is to convert 4:2:2 YUV video to 4:1:1 YUV video and do the raster-to-block transformation (shuffling). The purpose of shuffling is to convert the input raster format to block (4×4) format. Let $Y_{m,n}$ represent the nth pixel in m line. The input raster format is as shown in FIG. 2A, assuming 640 pixels per line. The shuffling algorithm provides the pixel data as shown in FIG. 2B.

In order to do the raster-to-block transformation on-chip memory is useful to temporarily store the pixel data. If the memory size is large enough to store 8-line data, the shuffling can be easily achieved in hardware. The memory is split into 2 banks where each stores 4-line data. After the first 4-line data is completely shuffled, the shuffled data is read out, and at the same time, the incoming next 4-line data is stored in the other memory bank. With this method, the control logic is straightforward and the static random access memory (SRAM) address technique is fixed, but the memory is still needed for the 8-lines of data. However, the size of the memory required for 8-line data is significant, especially when a line contains a large number of pixels. In fact, the minimum size of memory for shuffling is 4-line data. If the memory can only store 4-line data, after first 4-line data has been completely shuffled, the shuffled data is read out, and at the same time, the data of next 4-line is data is received and can be stored in the space where shuffled data is being read out. Because the order of write and read for the first 4 lines are different, the SRAM address scheme will not be fixed for each 4-line block. FIG. 2C depicts the write address for first 4-lines. FIG. 2D depicts the read address for first 4-line (for shuffled data) and write address for the next 4-line.

In this implementation, the shuffling address technique can be further simplified by using a 32-bit SRAM with byte write control. During write phase, 8-bit data is written into one of four 8-bit selected by byte write control. During the read phase, a 32-bit word is read out at the same time. Using this SRAM interface, the invention can pack 4 bytes into a double word. For example, it can store $Y_{0,0}$ to $Y_{0,3}$ ($Y_{0,0-3}$) into a double word and $Y_{0,4}$ to $Y_{0,7}$ ($Y_{0,4-7}$) into another double word. During the read out phase, the double word that contains $Y_{0,0}$ to $Y_{0,3}$ is read out at the same time. The invention can rearrange the address scheme of the write address for the first 4 line ($0^{th}$ to $3^{rd}$ line) as shown in FIG. 2E. Then the read address for first 4 line (for shuffled data) and write address for the next 4 line are shown in FIG. 2F.

Compared to the original technique, the aspect of the invention that uses a 32-bit wide SRAM can simplify the SRAM address scheme for shuffling. This address scheme can be computed by following algorithm:

(1) Given number of data per line, we have DPLs number of data per line/4−1

(2) Initial distance=1;

(3) Initial address=0;

(4) Evaluate X=current address+distance;

(5) If (X>DPL) next address=X−DPL;

Else next address=X;

(6) Go back to step (4) until end of 4 lines;

(7) Set distance to new distance for next 4 lines; and (8) Go back to step (3) until end of image.

In step (7) the invention sets the distance after writing 4 lines. The distance for the next 4 lines is derived from the address when writing the first data in the $2^{nd}$ line. From this example, the address for the first data of the $2^{nd}$ line is 0160, so the invention sets the distance for the next 4 lines to 0160. When reading shuffled data for the first 4 lines, the distance is 0160 and when writing the first data of the $5^{th}$ line, the invention gets the distance for the $8^{th}$ to $11^{th}$ lines from the address 0002.

C. Digital Cosine Transform (DCT)

Figure 3H:
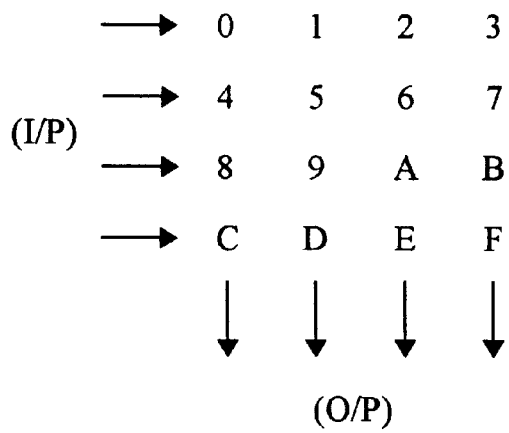
Figure 3H:
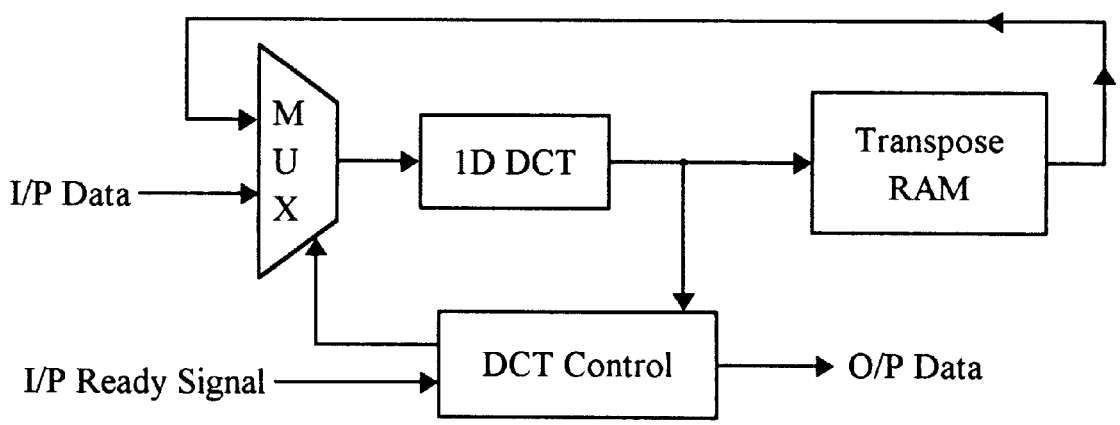

A 4×4 weighted DCT is described with reference to FIGS. 3A–H. A 4×4 DCT has benefits such as a reduced memory requirement and fast operation. In one aspect of the invention, the 4×4 DCT is reduced to two-dimensional DCT, as shown in FIG. 3A. Because the two-dimensional DCT is separable, the two-dimensional DCT can be further reduced to a one-dimensional DCT, as shown in FIG. 3B. FIG. 3C shows the coefficients used in the matrix A. FIG. 3D shows that the one-dimensional DCT can be written in an alternate form. FIG. 3E shows the weighting for the two-dimensional DCT using the coefficients in Table 1.

In order to further de-emphasize the high-frequency components, those DCT coefficients S(v,u) are further weighted by the coefficients W(v,u) to become Sw(v,u), which can further reduce of data amount. The weighting coefficients used in the invention are shown in Table 1.

TABLE 1

DCT Weighting Coefficients

| | | | |
|---|---|---|---|
| W(0,0) = 0.25 | W(1,0) = 0.46 | W(2,0) = 0.44 | W(3,0) = 0.38 |
| W(0,1) = 0.46 | W(1,1) = 0.43 | W(2,1) = 0.40 | W(3,1) = 0.35 |
| W(0,2) – 0.44 | W(1,2) = 0.40 | W(2,2) = 0.38 | W(3,2) = 0.33 |
| W(0,3) = 0.38 | W(1,3) = 0.35 | W(2,3) = 0.33 | W(3,3) = 0.29 |

FIG. 3F shows the equations after merging the one-dimensional DCT and weighting the final one-dimensional DCT equations. FIG. 3G shows the functional architecture of the one-dimensional DCT. FIG. 3H shows how the DCT is implemented in hardware. The result of the DCT is a 4×4 block of weighted frequency data.

D. ZigZag Scanning

Figures 4, 5:
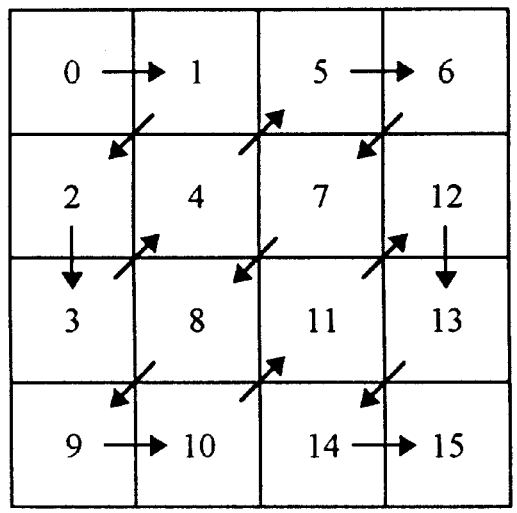
FIG. 4 depicts a zigzag pattern as used in the invention.
FIG. 5 depicts the Quantization zones used in the invention.

The zigzag scanning rearranges the order AC coefficients from two-dimensional array to one-dimensional linear array. The order approximates the behavior that scans from low-frequency components to high-frequency components. The exact zigzag scanning order in each 4×4 block is illustrated in FIG. 4.

According to the zigzag scanning order, the 4×4 regions are divided into 2 different zones. Each zone has its own set of quantization coefficients associated with a different Q-factor. The relationship between pixel location and the zone is illustrated in FIG. 5.

E. Q-factor Estimator

The dynamic range of AC coefficients should be reduced in order to further limit the encoding space. The technique used here is called quantization, which divides each of the AC coefficients by a certain predetermined number. The predetermined numbers are called quantization coefficients. In contrast to the fixed quantization coefficients for the entire image as used in standard JPEG, these quantization coefficients should be adjustable according to the complexity of the current 4×4 video block for the JPEG-Lite algorithm. Doing so helps the encoder adapt to the changing complexity among the individual blocks. In order to associate these coefficients, there are 4 possible Q-factor values, 0, 1, 2, 3, to pick. Different Q-factors are chosen according to the range of the AC coefficients. Their relationship is defined according to Table 2, where $AC_{max}$ is the largest AC coefficient in each 4×4 block.

TABLE 2

Q-Factor Decision Criterion

| Checking Conditions | Q-Factor Picked |
|---|---|
| $AC_{max} >= 24$ | Q = 3 |
| $24 > AC_{max} >= 12$ | Q = 2 |

TABLE 2-continued

Q-Factor Decision Criterion

| Checking Conditions | Q-Factor Picked |
|---|---|
| $12 > AC_{max} >= 6$ | Q = 1 |
| $6 > AC_{max}$ | Q = 3 |

According to Table 2, a Q-factor is 3 if the maximum AC coefficient is larger or equal to 24, 2 if the maximum AC coefficient is larger or equal to 12, 1 if the maximum AC coefficient is larger or equal to 6, and 0 otherwise. The numbers 24, 12 and 6 are three adjustable parameters that are used to control the video quality.

F. Quantization

Different Q-factors are associated with different sets of quantization coefficients. To reduce the hardware computation requirement, the coefficients are set to a power of 2, which are called quantization steps. Therefore, shift operations are used to replace the division (or multiplication) operations.

The quantization steps are different in different zones with the same Q-factor. For simplicity, the Y, U, V components share the same quantization table, which is shown in Table 3. After quantization, the DC coefficient will be kept as 8 bits number (two's complement) and the AC coefficients are clamped to a 5 bit number plus 1 sign bit. This helps to limit the codebook size and searching range.

TABLE 3

Quantization factors in different zones for all Y, U, and V components.

| | Zone 0 | Zone 1 |
|---|---|---|
| Q = 0 | 1 | 2 |
| Q = 1 | 2 | 4 |
| Q = 2 | 4 | 8 |
| Q = 3 | 8 | 16 |

G. DC Coding Selector

Each raw 4×4 block occupies 128 bits (4×4×8=128). With the target compression ratio at 4 to 6, there is already not much space available for each block (only 20–30 bits). Additionally, the DC coefficient occupies up to 8 bits. In order to reduce the overhead, the difference of the previous DC coefficient and present DC coefficient are transmitted if the difference is smaller than +15/−16. According to a simulation, there is about a 2 bit saving depending on the complexity of the image. If difference is used, the DC_TYPE bit is set to 1 (differential mode). Otherwise, the DC_TYPE bit is set to 0 (direct mode). This bit will be appended after the Q number in the packing scheme.

One reason to choose this representation is to avoid confusion with an all-zero two-byte header. For example, if the first DC coefficient is zero, the DC value is sent in differential mode with the DC_TYPE bit=1. If the first DC coefficient is non-zero, the DC value is sent in direct mode, which contains at least one non-zero bit. Therefore there should be a '1' in the first 2 bytes of the video stream.

Because of the special packing mechanism, Y0 and Y2 are packed together and Y1 and Y3 are a pair. This is the same for the U and V blocks. Each Y block compares its DC value with the one in front, where Y1 compares with Y0, Y2 compares with Y1, and Y3 compares with Y0. However, the U and V blocks compare the DC values with their own color blocks rather than with each other. This scheme can best incorporate the color continuity and the chance to accurately represent in differential mode is about 85% to 90%.

One interesting point is at the beginning of each horizontal line (including at the beginning of each frame). In this case the previous DC value is set to 0 rather than the last DC value recorded. The reason is the same as explained in the note above. The reason for this convention is the same as that described above regarding the desire to avoid confusion with an all-zero two-byte header.

H. Run-Length Coding (RLC) and Variable-Length Coding (VLC)

The run-length coding is applied to the quantized AC coefficients. The zeros between two non-zero AC coefficients are counted as another encoding parameter. The sequence of these 15 AC coefficients can be re-organized as pairs of (run[0], amp[0]), (run[1], amp[1]), and so on. These pairs correspond to certain code bitstream according to the run-length table shown in FIG. 6. The consecutive zeros, which continue until the last pixel, are represented by the symbol EOB instead. For decoding efficiency, EOB is inserted at the end of each block. This stands even the last AC coefficient is non-zero.

The table shown in FIG. 6 is the RLC codebook used in the JPEG-Lite scheme. First a lot of different images (50 or more) are processed to generate the statistic of different (run, amp) pairs. Then a Huffman-coding algorithm is applied to assign the bit sequence according to the probability. The higher the probability, the shorter the code length will be. FIG. 6 depicts the Run-length code-table used in the invention.

At the bottom the table, 'rrrr' represents the run count encoded in 4-bit number and 'aaaa' represents the absolute amplitude encoded in 4-bit number as well. The character 's' represents the sign of the amplitude and is '1' if the amplitude is negative.

The corresponding encoding space is illustrated in FIG. 7. The cells with numbers in are those (run, amp) pairs that can be encoded directly and the numbers indicate the length. The cells with the single hatching indicate the (run, amp) pairs that are encoded with a 0100110'b prefix, following by 3-bit run length, 5-bit amplitude and 1-bit sign. The cells with the double hatching indicate the (run, amp) pairs that are encoded with a 0100111'b prefix, followed by 4-bit run length, 4-bit amplitude and 1-bit sign. The blank region, where 5<run<14 and amp>15, shows the (run, amp) pairs that are not going to happen and ignored.

I. Packing and Length Estimation

After the variable-length encoding, the codes in different length are to be packed into 16-bit words for transmission and storage. By concatenating bitstreams from different blocks, there are higher chances that the total length can be reduced further.

Each packed code starts with a Q factor number (2 bits) and DC encoding type (1 bit) of the first Y block. If the DC coefficient is encoded as a difference, the next 5 bits are the DC difference. Otherwise the next 8 bits are the DC coefficient. Then packed data are continued with AC run-length encoded results. If the maximum number of non-zero Ac coefficients during the encoding process is reached, the RLC will stop encoding the rest of the AC coefficients and send an "EOB" token to complete. Otherwise the encoding process continues until the last coefficient is reached, followed by the "EOB" token.

The variable-length encoding process goes on for the second Y block, the third one, and the fourth one. Then codes from one U block and one V block are inserted. The same sequence is repeated until the end of each block line. At the beginning of each block line, the bitstreams continue except with a new previous DC value to be set to zero. At the very end of one video frame, additional '1' bits are appended at the last word to make is a complete 16-bit word.

The numbers of maximum non-zero AC coefficients to Y blocks and UV blocks are adjustable, according to the current compression statistics. If the total amount of data is much higher than the desired budget, these numbers will be decreased at the end of the current block line.

Figure 8:
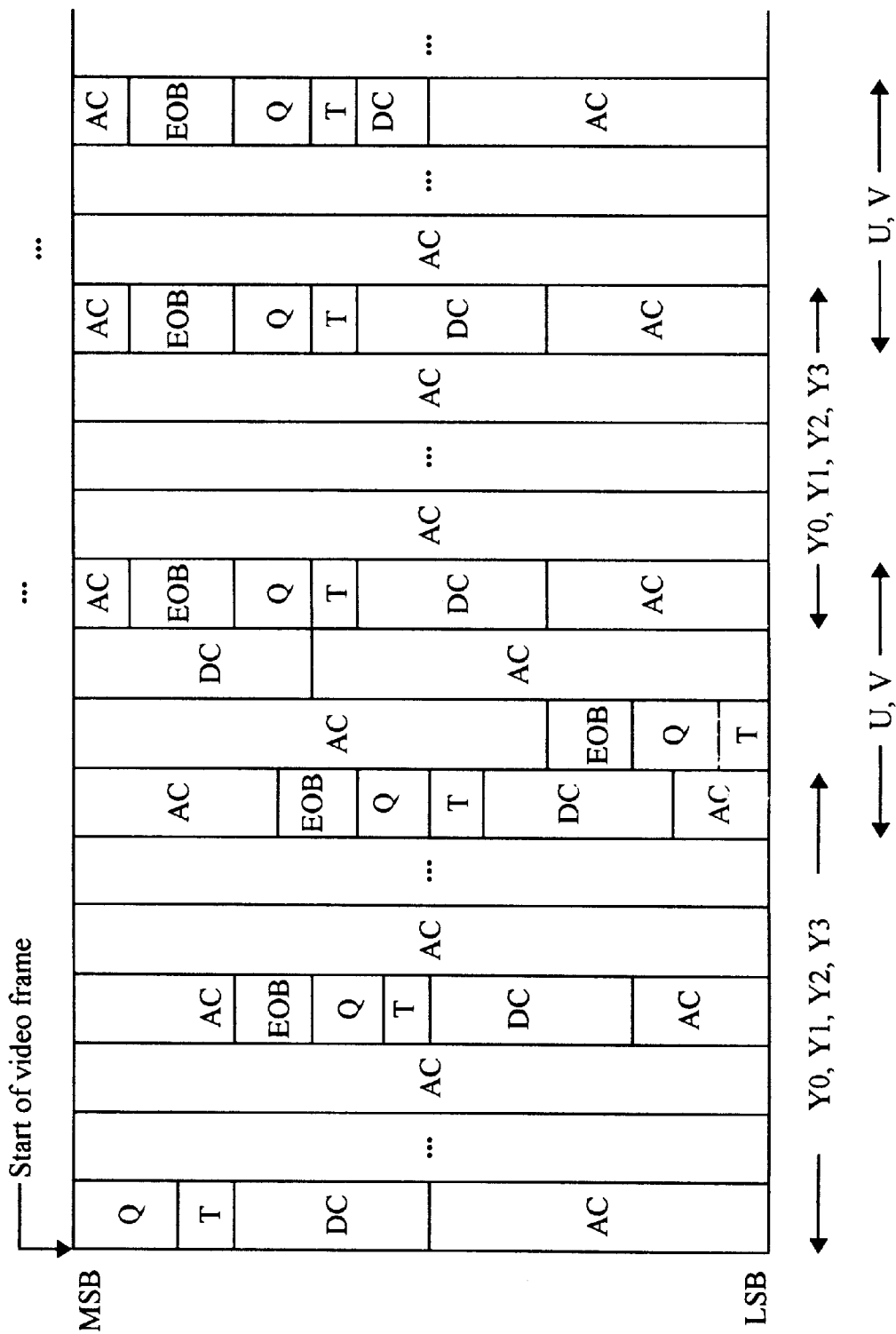
FIG. 8 illustrates the packing scheme for YUV 411 input stream.

FIG. 8 illustrates the packing scheme for YUV 411 input stream. The data stream comes at the order of Y0, Y1, Y2, Y3, U, V and the packing order similarly follows. Note that the video data bitstreams start from word boundary at the beginning of each frame.

At the time of data transfer, the total lengths of the codes are accumulated for each block line and each frame. When a bit rate control is employed, the lengths of each block line or frame are reported to the bit-rate controller (BRC) to make adjustments of compression settings in order to maintain a constant bit rate.

J. Dynamic Bit-Rate Controller (BRC)

The introduction of a universal serial bus (USB) interface is a benefit for implementing a communication between a digital capture device (e.g. camera) and a computer. The USB is a "plug-and-play" interface between a computer and add-on devices. With the USB capability supporting a data speed of 12 megabits per second, it accommodates a wide range of devices, such as audio players, joysticks, keyboards, telephones, scanners, and printers. A new device can be added to a personal computer (PC) without the need for an adapter card or even the need to power down the computer before plugging in the USB peripheral. Accordingly, computer users no longer need to worry about selecting the right serial port, installing expansion cards, or the technical headaches of dip switches, jumpers, software drivers, IRQ settings, DMA channels and 1/0 addresses.

In one aspect of the invention, the video compressor is coupled to another device via a USB. Because the USB bus provides for a fixed, pre-specified data transfer rate (for isochronous transfer), the dynamic bit-rate controller is important for monitoring the data transfer to provide a constant video data rate. The dynamic bit-rate controller (BRC) can control the data rate by adjusting the maximum allowable non-zero AC coefficients. By doing so, the encoded data rate is reduced at the expense of video quality (resulting in poorer video quality).

Figures 9, 10A:
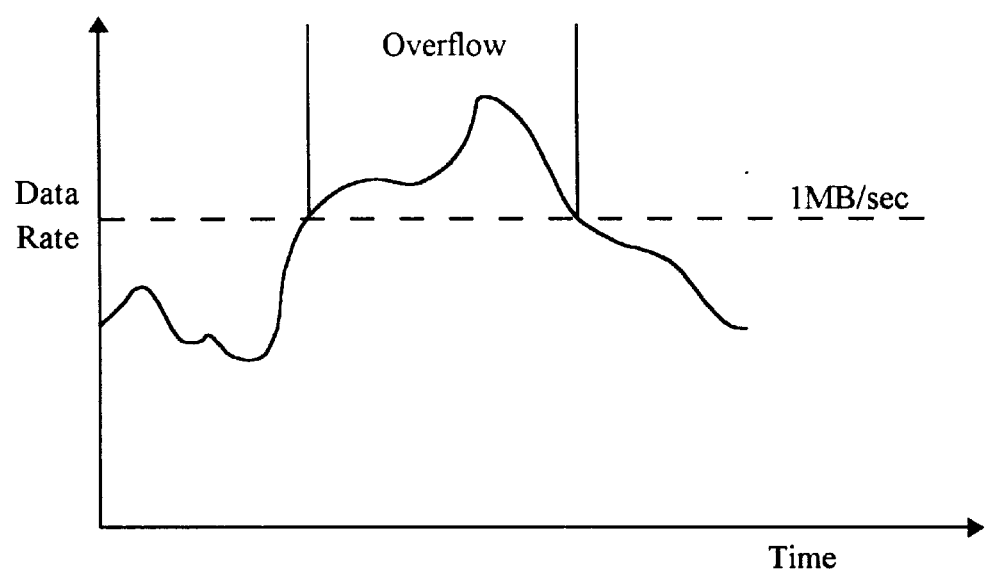
FIG. 9 shows a list of supported video data formats.
FIG. 10A shows the data overflowing through a fixed-rate channel.

To make the video-conferencing or video mail applications more useful, it is desirable to send out larger size of video images. There are several popular video formats to be supported: CIF, QCIF, SIF, QSIF and VGA. Their video sizes and the required transfer data rate are shown in FIG. 9.

The USB interface has its limitation. Of the four supported data transfer schemes, isochronous transfers are the best to handle the large volume of the video data. The other three, bulk transfers, interrupt transfers and the control transfers have difficulty sustaining the necessary bandwidth. For a USB isochronous transfer, the maximum bandwidth for each device is 1 Mbytes per second. Without the compression scheme, the video camera can only barely support QCIF and QSIF formats.

There are already a few conventional video compression algorithms, such as JPEG, H.261, H.263, MPEG1/2, and DV. The JPEG algorithm is the simplest one but lacks the capability to support constant bit-rate data. The other four algorithms can support constant bit-rate data but need very complicated mathematical computations for the encoding process. Many hardware solutions have the performance required to compress and decompress video images in real time, but have an extremely high total system cost. The high unit price is due to the large silicon area required to process complex JPEG algorithms, and to the extra required VRAM or DRAM frame buffer memory chips.

The invention (JPEG-Lite) is a DCT-based compression scheme that can efficiently compress the incoming video data stream at a ratio of 4:1 to 6:1 with a minimum hardware requirement and can decompress the bitstream at a PC with a minimum computation requirement. The dynamic bit-rate control capability makes it possible to regulate the bit-rate flowing through the transmission channel (e.g. USB) without visual degradation.

The PC image capture device (e.g. camera) communicates with the PC via USB interface. The communication channel can be characterized as a channel that can only accommodate only a certain number of data passing through it. If there is more data than the channel can handle, this is called over-flow situation and some of the data might be lost in the worst case.

Using the conventional JPEG algorithm to compress video images will encounter the problem that the compressed data comes at a random rate as shown in FIG. 10A. Sometimes the portion of image to be encoded has a more complex scene which leads to a large amount of data and a high bitstream. If accumulated, there might be more data than the USB interface can handle and there will be an overflow problem.

Figure 10B:
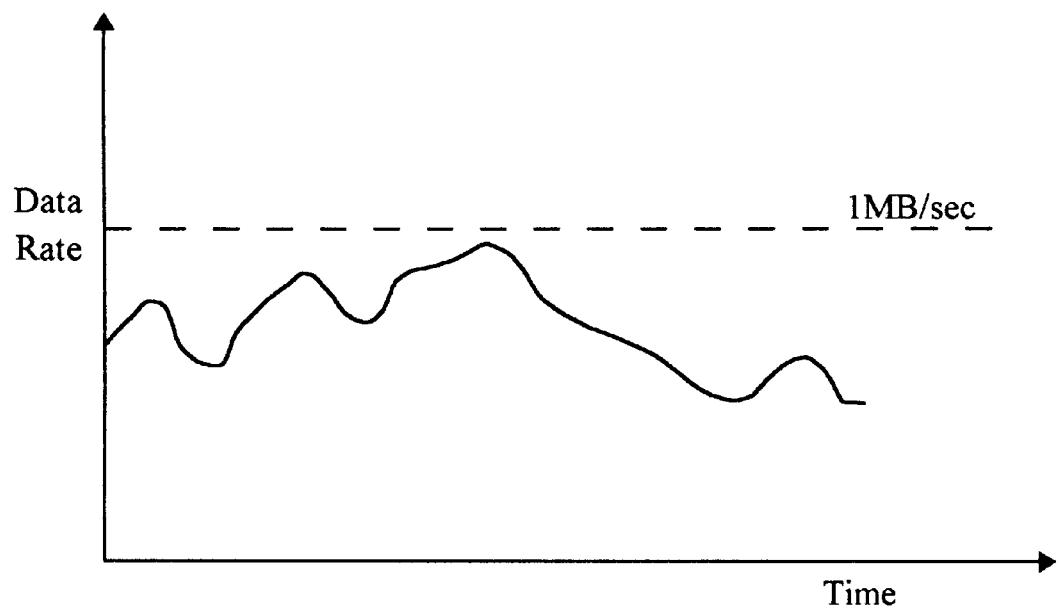
FIG. 10B shows the data rate regulated by the bit-rate controller according to the invention.

The bit-rate controller (BRC) works as a regulator and smooth out the data rate by modifying the encoding algorithm. Some of the information is discarded to reduce the data rate. The graph of FIG. 10A is redrawn in FIG. 10B when the bit-rate controller is applied. Note that the bit-rate controller doesn't enforce the data rate at a certain fixed number, but rather at a reasonable range just below the desire number.

Because the USB provides a fixed, pre-specified data transfer rate (for isochronous transfer), the dynamic bit-rate controller is important for monitoring the data transfer to provide a constant video rate. The dynamic bit-rate controller (BRC) controls the rate by adjusting the maximum allowable non-zero AC coefficients.

The maximum number of non-zero AC coefficients kept is referred by an index (ridx), which maps into two sets of numbers for Y blocks and U, V blocks, respectively. The relationship between ridx and the retaining AC coefficients is shown in Table 4. The larger the index number, the more AC coefficients will be kept, which means higher quality.

TABLE 4

Relationship between the maximum non-zero AC coefficients and the ridx.

| ridx | Max. Non-zero AC coeff. for Y blocks | Max. Non-zero AC coeff. for U, V blocks |
|---|---|---|
| 0 | 0 | 0 |
| 1 | 1 | 1 |
| 3 | 3 | 2 |
| 4 | 4 | 3 |
| 5 | 5 | 3 |
| 6 | 6 | 4 |
| 7 | 7 | 4 |
| 8 | 8 | 5 |
| 9 | 9 | 5 |
| 10 | 10 | 6 |
| 11 | 11 | 8 |
| 12 | 12 | 10 |
| 13 | 13 | 12 |
| 14 | 14 | 14 |
| 15 | 15 | 15 |

The above table is built based on the following rules.

(1) The Y component is more important than U,V components because it represents the luminance information. That's why the number of Y coefficients increases linearly with the index.
(2) The U, V components play less important role so fewer coefficients need to be kept at low compression index. At this time the compression ratio is higher and the quality is poorer.

Figure 10C:
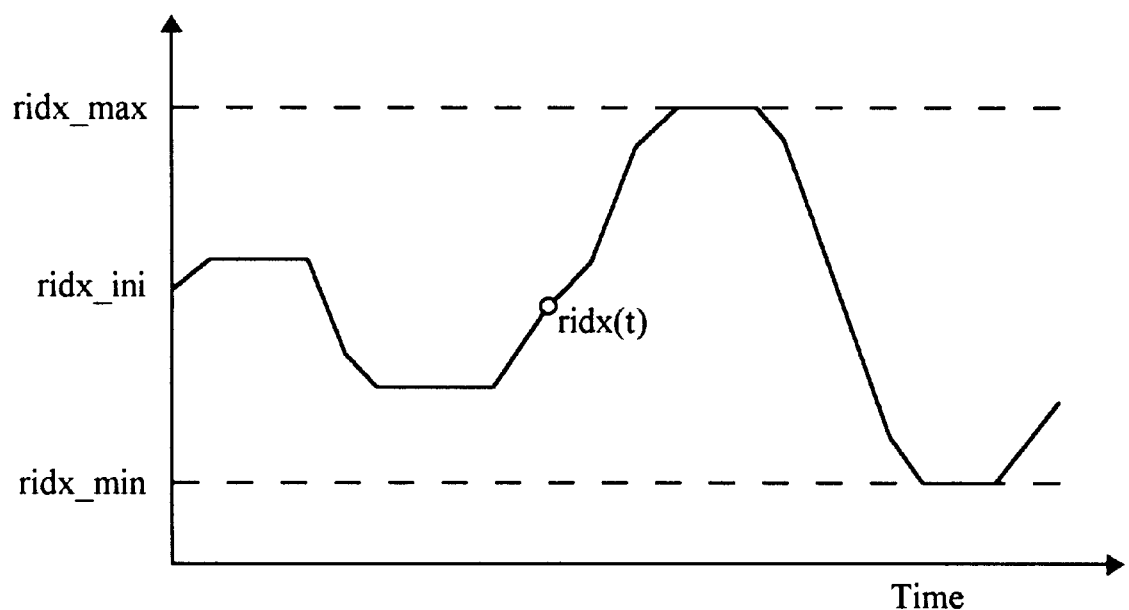
FIG. 10C shows change of compression index (ridx) that are bounded by maximum and minimum values.

There are three adjustable parameters for the BRC, the initial index ridx_ini, the maximum index ridx_max, and the minimum index ridx_min. At the beginning of each frame, the index is set to ridx_ini. As the compression and encoding go on, the ridx goes up and down according to the length of the encoded bitstream but is bounded by the minimum and the maximum values. The larger the ridx is, the more AC coefficients will be kept in the encoding process, which leads to better images. FIG. 10C shows change of compression index (ridx) that are bounded by maximum and minimum values.

Figure 10D:
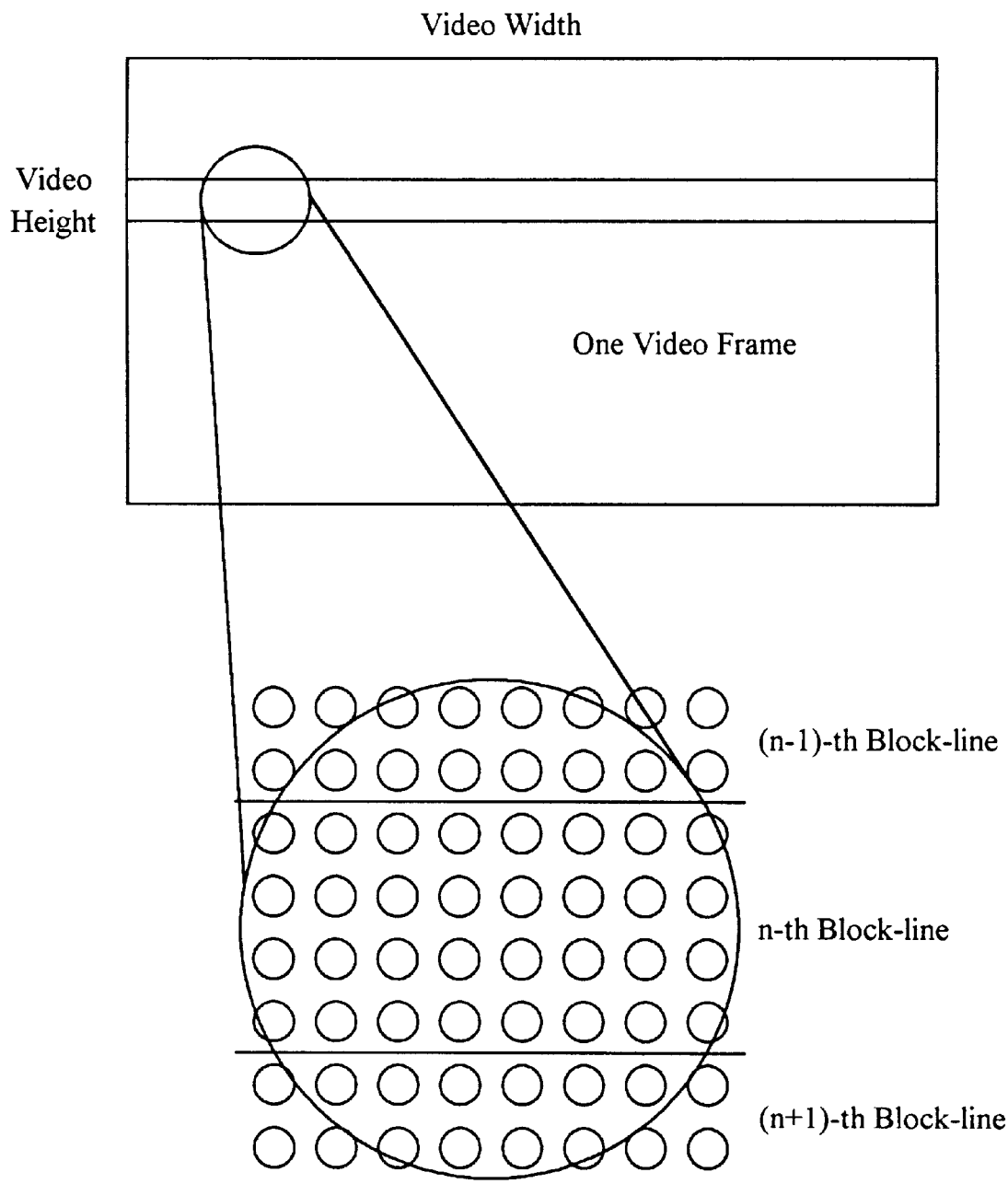
FIG. 10D illustrates one block line.

Change of the maximum number of non-zero AC coefficients is made at the end of every block line. Each block line is defined as the (4×Width) pixel region where the 4×4 DCT will span from the left to the right in each video frame, as shown in FIG. 10D. At the end of each block line, the BRC makes adjustments based on two criteria: local data-stream increment and global data-stream accumulation.

To avoid minor changes all the time, the $L_{th}$ value is used as programmable threshold to buffer cases of minor over-runs or under-runs. At the end of block line BL[i], the BRC compares the global data-stream accumulation value ($L_{all}$) with the desired accumulation value ($L_{acc}$). The decision will fall into the following 4 cases:
(1) The total data count is less than the desired count.
(2) The data count is larger than the desired count plus two times the threshold ($L_{th}$).
(3) The data count is larger than the desired count plus the threshold ($L_{th}$) but not in case 2.
(4) Not in any of the case 1, 2, 3.

A pseudo-C program showing the decision steps on the global level to describe the above behavior is shown below.

if $((L_{all}-L_{acc})>(2 * L_{th}))$, then it is case 2;
else if $((L_{all}-L_{acc})>L_{th})$, then it is case 3;
else if $((L_{acc}-L_{all})<L_{th})$, then it is case 1;
else, it is case 4;

Generally the compression index (ridx) can be increased in case 1 because the data stream from the encoding comes at a higher compression rate. The index has to be decreased in case 2 and 3 since the encoder generates too much data. However, there are some rare cases that the compression indexes (ridx) have to be decreased even for the first case. This is due to the limited USB isochronous transfer bandwidth at any given time. A situation that meets the criterion 1 doesn't necessarily guarantee the incoming data rate is within a certain range. During any time interval (1 ms in USB), only a certain amount of data can be transferred.

To know how many new data generated in each block line, BRC compares the local datastream increment value ($L_{inc}$) with the desired increment ($L_{opt}$). And again the decision will fall into the following 4 cases:
(1) The data increment is less than the desired increment.
(2) The data increment is larger than the desired increment plus two times the threshold ($L_{th}$).
(3) The data increment is larger than the desired increment plus the threshold ($L_{th}$) but not in case 2.
(4) Not in any of the case 1, 2, 3.

A pseudo-C program showing the decision steps on the local level to describe the above behavior is shown below.

if $((L_{inc}-L_{opt})>(2 * L_{th}))$, it is case 2;
else if $(L_{inc}-L_{opt})>L_{th})$, it is case 3;
else if $(L_{opt}-L_{inc})<L_{th})$, it is case 1;
else, it is case 4;

The BRC module is based on the above global and local comparisons to make a decision of the actual change of compression index (ridx). The actual change of ridx is determined by checking Table 5. Note that the changes made are specially designed to be large enough to reduce the data rate but small enough to avoid the sudden quality loss.

TABLE 5

Conditions for the Change of ridx

| Global Accumulation | Local Increment | | | |
|---|---|---|---|---|
| | Case 1 | Case 4 | Case 3 | Case 2 |
| Case 1 | +2 | +1 | −1 | −2 |
| Case 4 | +1 | 0 | −1 | −2 |
| Case 3 | 0 | −1 | −1 | −2 |
| Case 2 | −1 | −1 | −2 | −2 |

At the end of the each video frame, the compression index will be reset to the initial value, rather than be remembered. This is because the compression index will increase to a large value if the bottom of the video image is not complicated. If the last ridx is remembered and applied to the next video frame, there are chances that the top portion of the video image is rather complicated. At this time, there can be too much compressed data generated and the BRC is not be able to cope with this situation very rapidly and the hardware may fail. Therefore, restoring the compression index to the initial value is the best technique.

K. Error Detection and Recovery

In one embodiment of the invention, a method is provided for simple, low-overhead error recovery. In one aspect of the invention, the error detection and recovery is designed for the USB interface. As described above, isochronous transfers can handle the large volume of the video data. For USB isochronous transfer, the maximum bandwidth for each device is 1 Mbytes per second.

Errors can happen at any bit during the serial bus transmission. The possible positions are described below.

(1) The error bit happens at the header Since the size of the header is fixed, the error bit will only affect the decoding of video parameters but not the video data.
(2) The error bit happens at the Q-factor bits: The scales of AC coefficients are not de-quantized correctly in that block. But the damage is limited in that particular block only.
(3) The error bit happens at the DC_TYPE bit: The decoding sequence is completely wrong and the error could possibly propagate till the end.
(4) The error bit happens at the DC values: This will affect the DC value of the current blocks and those the following blocks that are specified in differential mode. Therefore these blocks will be affected. However, the results become correct once the decoder find a DC value that's encoded directly, not in incremental value.
(5) The error bit happens at the sign bit of (run, amp) code: This will change the sign of the AC value, as well as the reconstructed block. But the damage is limited in the block only.
(6) The error bit happens at the (run, amp) code: Sometimes the software decoder could decode a different (run, amp) pairs without further corrupting the bitstream, if the length is the same. Otherwise, the error is significant and could possibly go till the end of the code.

From this analysis, it is clear that cases 3 and 6 require the error-recovery scheme so the software decoder can continue working on the next frame. For the other error cases, no error-correction steps are implemented because of large software overhead.

The innovative technique employed by the invention is by taking the fact that a leading DC value in each block line will not be zero in the "direct encoding mode" at the beginning of each block line, where the whole values are sent. If the first DC in the block line is zero, this DC value is sent in differential mode with DC_TYPE bit=1. If the first DC is non-zero this DC value is sent in direct mode, which contains at least one non-zero bits. Therefore there is a '1' in the first 2 bytes of the video stream. That means the software decoder can detect an error when receiving two consecutive bytes of zeros at the beginning of each block line.

Therefore, appending a certain number bytes of zeros at the end of the bitstream helps the system to recover from data corruption. The exact number of bytes depends on the image size. However, it is desirable to have the minimum zeros appended because of the hardware costs (to generate zeros) and the storage costs (in the main memory of PC).

For example, take a CIF image size of 352×288. There is 88 (352/4) Y blocks in each block line, along with 22 (3521414) U blocks and 22 V blocks. There are 132 blocks total in each of the block lines. In the worst case, assuming that the DC is encoded in direct mode and ended immediately, the shortest code is one zero DC value and one EOB (which means the rest of the AC coefficients are all zeros). Then each block uses 13 bits, which is approximately equal to 1 16-bit word. Therefore, the minimum number of zero words to be appended is 352 * (1/4 * 3/2)=352 * (3/8)=132 words. The task to append zeros is done in the hardware encoder before it sends out EOF (end of video frame) signal.

The overhead in the software decoding is very low since it only needs to check at the beginning of each block line. And the zeros appended will only increase the compressed data bit-stream by only 1% (268/25000). In conclusion, this is a very effective error-recovery scheme.

All the above discussions are related to USB transfer errors. However, another error type that happens is when the USB FIFO becomes full and overflows. Because the input pixel data coming from CCD can not be paused, there is no way to stop the pixel processing pipeline unless a lot of FIFOs are inserted as buffers. In case of a FIFO full error, the USB FIFO module acknowledges VPACK module and ignores the data sent. The VPACK module continues without interruption but has to remember the error condition. After finishing sending one frame, VPACK has to acknowledge the host about the error via USB control registers. The corrupted video data is thrown away and the software decoder waits for the data of the next video frame. The time interval to do a zero-padding operation can be enlarged by inserting waiting states, which can avoid the FIFO overflow error happening at the end.

Additionally, while the explanation is provided for USB, any communication medium can be used employing the invention.

L. Software Decoder

The JPEG-Lite algorithm is designed not only for hardware encoding simplicity, but also for the software decoding efficiency. Since the PC has to do the software decoding and display the video sequence onto screen, it is desirable to have a high performance software decoder.

According to the software simulation, the achievable software decoding frame rates are summarized in Table 6. It is clearly seen that the JPEG-Lite algorithm can provide appropriate software decoding capability. The extra spare power of the CPU can be used for other applications, such as video-mail processing, video-conferencing, and similar applications.

TABLE 6

Comparison of Software Decoding Performance

|  | AMD K6 - 200 | Pentium II - 300 |
| --- | --- | --- |
| 640 × 480 | 12 | 17 |
| 352 × 288 | 36 | 54 |
| 320 × 240 | 45 | 68 |
| 176 × 144 | 135 | 200 |
| 160 × 120 | 167 | 244 |

M. Conclusion

Advantages of the present invention include an image compression technique that is both fast and efficient. Additionally, the invention provides a fast and efficient image compression technique that can be applied to moving images.

Having disclosed exemplary embodiments and the best mode, modifications and variations may be made to the disclosed embodiments while remaining within the scope of the invention as defined by the following claims.

What is claimed is:

1. An image compression apparatus for compressing image data provided to an input terminal and providing compressed data to an output terminal, comprising:

a 4×4 weighted digital cosine transformer (DCT) coupled to the input terminal and configured to convert the image data into weighted frequency data, wherein the 4×4 weighted DCT is divided into a two-dimensional DCT for processing;

a zigzag circuit coupled to the DCT and configured to zigzag process the frequency data and generate create zigzag data;

a Q-factor estimator coupled to the DCT and configured to estimate the frequency data and generate a Q-factor;

a DC coding circuit coupled to the zigzag circuit and configured to code the zigzag data and generate a DC code;

a quantization circuit coupled to the zigzag circuit and the Q-factor estimator and configured to quantize the zigzag data based on the Q-factor and generate quantized data; and a coding circuit coupled to the DC coding circuit and the quantization circuit and configured to encode the quantized data to create variable length data as the compressed data to the output terminal.

2. The image compression apparatus of claim 1, wherein: the two-dimensional DCT is further divided into a one-dimensional DCT for processing.

3. The image compression apparatus of claim 1, wherein: the DCT includes a special coefficient table is employed to gain a high degree of compression.

4. The image compression apparatus of claim 1, wherein: the DCT includes a special coefficient table of only 4 quantization coefficients.

5. The image compression apparatus of claim 1, wherein: the DC coding circuit employs a dynamic DC predictor to further reduce the data bits.

6. The image compression apparatus of claim 1, wherein: the quantization circuit includes a quantization table is selected to provide high compression while retaining a significant amount of reproducibility of the original image.

7. The image compression apparatus of claim 1, wherein: the quantization circuit includes a quantization table having two quantization zones to distinguish the high-frequency coefficients and the low-frequency coefficients.

8. The image compression apparatus of claim 1, wherein: the coding circuit implements at least one of Run Length Coding (RLC) and Variable Length Coding (VLC).

9. The image compression apparatus of claim 1, further comprising:

a dynamic bit rate controller coupled to the coding circuit and configured to reduce bits in the compressed data when the bandwidth delivered to the output terminal is limited.

10. The image compression apparatus of claim 1, wherein: the coding circuit employs compression index to decide the number of AC coefficients to be kept.

11. The image compression apparatus of claim 10, wherein: the coding circuit employs a local data increment and a global data accumulation result to determine the change of compression index.

12. The image compression apparatus of claim 10, wherein: the coding circuit updates the compression index only at the end of block line which reduces the hardware overhead.

13. The image compression apparatus of claim 1, further comprising:

a receiving device coupled to the output terminal and configured the receive the compressed data and to detect errors in the compressed data; and wherein the receiving device is configured to reconstruct valid portions of the image in the presence of bad data.

14. The image compression apparatus of claim 13, wherein: the compression apparatus employs a unique error condition code that does not occur in the presence of valid compression data.

15. The image compression apparatus of claim 13, wherein: the compression apparatus employs a unique error condition code of 00 as EOB that does not occur in the presence of valid compression data.

16. The image compression apparatus of claim 1, wherein:

the DCT is implemented in software;

the zigzag circuit is implemented in software;

the Q-factor estimator is implemented in software;

the DC coding circuit is implemented in software;

the quantization circuit is implemented in software; and the coding circuit is implemented in software.

17. The image compression apparatus of claim 1, wherein: the quantization circuit includes a quantization table having two quantization zones to distinguish the high-frequency coefficients and the low-frequency coefficients.

18. An image compression apparatus for compressing image data provided to an input terminal and providing compressed data to an output terminal, comprising:

a 4×4 weighted digital cosine transformer (DCT) coupled to the input terminal and configured to convert the image data into weighted frequency data;

a zigzag circuit coupled to the DCT and configured to zigzag process the frequency data and generate create zigzag data;

a Q-factor estimator coupled to the DCT and configured to estimate the frequency data and generate a Q-factor;

a DC coding circuit coupled to the zigzag circuit and configured to code the zigzag data and generate a DC code;

a quantization circuit coupled to the zigzag circuit and the Q-factor estimator and configured to quantize the zigzag data based on the Q-factor and generate quantized data;

a coding circuit coupled to the DC coding circuit and the quantization circuit and configured to encode the quantized data to create variable length data as the compressed data to the output terminal;

wherein the coding circuit employs compression index to decide the number of AC coefficients to be kept; and wherein the coding circuit employs a local data increment and a global data accumulation result to determine the change of compression index.

19. An image compression apparatus for compressing image data provided to an input terminal and providing compressed data to an output terminal, comprising:

a 4×4 weighted digital cosine transformer (DCT) coupled to the input terminal and configured to convert the image data into weighted frequency data;

a zigzag circuit coupled to the DCT and configured to zigzag process the frequency data and generate create zigzag data;

a Q-factor estimator coupled to the DCT and configured to estimate the frequency data and generate a Q-factor;

a DC coding circuit coupled to the zigzag circuit and configured to code the zigzag data and generate a DC code;

a quantization circuit coupled to the zigzag circuit and the Q-factor estimator and configured to quantize the zigzag data based on the Q-factor and generate quantized data;

a coding circuit coupled to the DC coding circuit and the quantization circuit and configured to encode the quantized data to create variable length data as the compressed data to the output terminal;

wherein the coding circuit employs compression index to decide the number of AC coefficients to be kept; and wherein the coding circuit updates the compression index only at the end of block line which reduces the hardware overhead.

20. An image compression apparatus for compressing image data provided to an input terminal and providing compressed data to an output terminal, comprising:

a 4×4 weighted digital cosine transformer (DCT) coupled to the input terminal and configured to convert the image data into weighted frequency data;

a zigzag circuit coupled to the DCT and configured to zigzag process the frequency data and generate create zigzag data;

a Q-factor estimator coupled to the DCT and configured to estimate the frequency data and generate a Q-factor;

a DC coding circuit coupled to the zigzag circuit and configured to code the zigzag data and generate a DC code;

a quantization circuit coupled to the zigzag circuit and the Q-factor estimator and configured to quantize the zigzag data based on the Q-factor and generate quantized data;

a coding circuit coupled to the DC coding circuit and the quantization circuit and configured to encode the quantized data to create variable length data as the compressed data to the output terminal;

a receiving device coupled to the output terminal and configured the receive the compressed data and to detect errors in the compressed data; and wherein the receiving device is configured to reconstruct valid portions of the image in the presence of bad data.

21. The image compression apparatus of claim 20, wherein:

the compression apparatus employs a unique error condition code that does not occur in the presence of valid compression data.

22. The image compression apparatus of claim 20, wherein:

the compression apparatus employs a unique error condition code of 00 as EOB that does not occur in the presence of valid compression data.

* * * * *